US012581272B2

(12) United States Patent
Mohamad et al.

(10) Patent No.: US 12,581,272 B2
(45) Date of Patent: Mar. 17, 2026

(54) REAL-TIME LOCATION SYSTEM AND METHOD USING SENSOR-TO-SENSOR DATA COLLECTION

(71) Applicant: Siemens Industry, Inc., Alpharetta, GA (US)

(72) Inventors: Mustafa Mohamad, Kitchener (CA); Jun Gao, Saratoga, CA (US); Mohammadali Khazen, Toronto (CA)

(73) Assignee: Siemens Industry, Inc., Alpharetta, GA (US)

( * ) Notice: Subject to any disclaimer, the term of this patent is extended or adjusted under 35 U.S.C. 154(b) by 225 days.

(21) Appl. No.: 18/458,528

(22) Filed: Aug. 30, 2023

(65) Prior Publication Data

US 2025/0080948 A1 Mar. 6, 2025

(51) Int. Cl.
| | |
|---|---|
| *H04W 4/029* | (2018.01) |
| *H04B 17/318* | (2015.01) |
| *H04W 4/38* | (2018.01) |

(52) U.S. Cl.
CPC .......... *H04W 4/029* (2018.02); *H04B 17/318* (2015.01); *H04W 4/38* (2018.02)

(58) Field of Classification Search
CPC ...... H04W 4/029; H04W 4/38; H04B 17/318; G01S 5/02; G01S 5/0252
USPC ........................................ 455/456.1
See application file for complete search history.

(56) References Cited

U.S. PATENT DOCUMENTS

| | | |
|---|---|---|
| 10,217,346 B1 | 2/2019 | Zhang et al. |
| 10,349,216 B1 | 7/2019 | Tran et al. |
| 10,422,854 B1 | 9/2019 | Huberman et al. |
| 10,705,179 B2 | 7/2020 | Gao et al. |
| 10,716,089 B1 | 7/2020 | Huberman et al. |
| 11,032,665 B1 | 6/2021 | George et al. |
| 11,062,606 B2 | 7/2021 | Beauchamp et al. |
| 11,096,008 B1 | 8/2021 | Batten |
| 11,137,762 B2 | 10/2021 | Zhang et al. |
| 11,153,720 B1 | 10/2021 | Newton et al. |
| 11,154,220 B2 | 10/2021 | Nakagawa et al. |
| 11,246,010 B2 | 2/2022 | Mao et al. |
| 11,302,031 B2 | 4/2022 | Shin et al. |

(Continued)

FOREIGN PATENT DOCUMENTS

| | | |
|---|---|---|
| AU | 2021102531 | 7/2021 |
| AU | 2021105951 A4 | 10/2021 |

(Continued)

OTHER PUBLICATIONS

Paulino, "Self-Localization via Circular Bluetooth 5.1 Antenna Array Receiver", Jan. 3, 2023 (Year: 2023).*

(Continued)

*Primary Examiner* — Juan A Torres

(57) ABSTRACT

A real-time location system comprises sensors and an upstream device communicating with the sensors. Sensor pairs of the sensors include a transmitting sensor and a receiving sensor. Each sensor is assigned as the transmitting sensor in turn, while all other sensors are designated as the receiving sensors and collect signal strength data. The upstream device determines a labelled dataset based on the signal strength data for the sensor pairs and zone labels associated with the signal strength data. The RTLS ML model is trained based on the labelled dataset.

16 Claims, 7 Drawing Sheets

(56) References Cited

U.S. PATENT DOCUMENTS

| | | | |
|---|---|---|---|
| 11,638,187 | B2 * | 4/2023 | Ye ........................ H04W 4/029 |
| | | | 455/440 |
| 11,719,458 | B2 | 8/2023 | Lin et al. |
| 2019/0285748 | A1 | 9/2019 | DeVries et al. |
| 2019/0302221 | A1 | 10/2019 | Sheng et al. |
| 2020/0037112 | A1 * | 1/2020 | Tyagi ..................... H04B 17/27 |
| 2021/0029500 | A1 | 1/2021 | Ye et al. |
| 2021/0264316 | A1 | 8/2021 | Zhang et al. |
| 2021/0279549 | A1 | 9/2021 | Spanos et al. |
| 2021/0319894 | A1 | 10/2021 | Sobol et al. |
| 2021/0374122 | A1 * | 12/2021 | Chatterjea .............. G16H 40/20 |
| 2022/0007137 | A1 | 1/2022 | Choi et al. |
| 2022/0141619 | A1 | 5/2022 | Parikh et al. |
| 2022/0171820 | A1 | 6/2022 | Neun et al. |
| 2023/0129589 | A1 | 4/2023 | Parikh et al. |
| 2023/0333199 | A1 * | 10/2023 | Lehavi ................ G01S 5/02521 |

FOREIGN PATENT DOCUMENTS

| | | | |
|---|---|---|---|
| CN | 107396322 | B | 12/2019 |
| CN | 110891241 | A | 3/2020 |
| CN | 112165684 | B | 9/2021 |
| CN | 113639755 | A | 11/2021 |
| CN | 113640740 | A | 11/2021 |
| CN | 113873423 | A | 12/2021 |
| CN | 112423265 | B | 4/2022 |
| CN | 113347559 | B | 4/2022 |
| CN | 114449452 | A | 5/2022 |
| KR | 101975117 | B1 | 5/2019 |
| KR | 20220141619 | A | 10/2022 |
| WO | 2019134549 | | 7/2019 |

OTHER PUBLICATIONS

Guanglin Tang et al., "Bluetooth Low Energy Technology and Deep Learning to Facilitate Clinical Applications", Medical Artificial Intelligence and Automation (MAIA) Laboratory, Department of Radiation Oncology, University of Texas Southwestern Medical Center, Dallas, TX 75235, United States of America, 2020.

* cited by examiner

200

202

Communications
204

Processor
206

Communication
210

Operation
212

Input Components
220

226  228  230  232

User Interface
224

Memory
208

Data Values
214

Output Components
222

234  236  238  240

Data Thresholds
216

Statistical Values
218

110

300

302

Communications
304

Processor
306

Data
Augmentation
310

Training/Inference
312

I/O Interfaces
318

User Interface
320

Memory
308

ML Model
314

Labeled Dataset
316

112

700

720

710

| Zone | Zone Labeled Dataset | | | |
| | Receiving Sensors | | | |
| | Sensor 1 | Sensor 2 | • • • | Sensor 12 |
| Zone_0 | -65 | -60 | • • • | -99 |
| Zone_0 | -65 | -55 | • • • | -90 |
| • • • | • • • | • • • | • • • | • • • |
| Zone_1 | -55 | -50 | • • • | -80 |
| Zone_1 | -47 | -52 | • • • | -81 |
| • • • | • • • | • • • | • • • | • • • |
| Zone_2 | -77 | -80 | • • • | -85 |
| Zone_2 | -70 | -84 | • • • | -80 |

REAL-TIME LOCATION SYSTEM AND METHOD USING SENSOR-TO-SENSOR DATA COLLECTION

FIELD OF THE INVENTION

This application relates to the field of asset tracking systems and, more particularly, to a real-time location system of a group of radio frequency (RF) sensors for asset tracking.

BACKGROUND

Building management systems encompass a wide variety of equipment that aid in monitoring and controlling building operations. Building management systems often include one or more environmental control sub-systems, such as security, fire safety, lighting, heating, ventilation, and air conditioning ("HVAC") systems. The systems may also provide non-environmental control features for management and occupants of a building, such as indoor location tracking of assets (including occupants).

A Real-time Location System (RTLS) infrastructure installed in a building, or a single floor plan, usually consists of sensors, installed at ceiling height or desk level, or both, in a multi-zone area with different sizes, ceiling height, furniture, or other different geological features. The RTLS can also be installed in multiple-floor buildings. The RTLS system tracks Bluetooth tags attached to assets. When a tag beacons, the sensors installed in the building receive the beacons, the characteristics of the received signal at the sensors (a.k.a. sensor activation pattern) is used to locate the tags within the building floorplan.

An RTLS system operation consists of two phases: an offline and online phase. During the offline phase, a machine learning (ML) model is trained to recognize the received signal strength indicator (RSSI) characteristics for each zone. A zone is simply any bounded area in a floorplan such as a room. The training data is collected by moving tags inside each zone while recording the RSSI values at the sensors and labelling the data with the zone name. During the online phase, the trained model is used to make inference on an RSSI signal coming from a tag to output the most likely zone location.

The data collection process during the offline phase is generally performed manually by a person. This can be costly in terms of man hours as well as difficult to organize logistically at customer sites because it could interfere with customer operations. It's also intrusive and may require security clearance by customers.

SUMMARY

In accordance with at least one embodiment of the disclosure, a Real-time Location System (RTLS) approach for asset tracking is provided. The RTLS utilizes machine learning techniques to locate asset tags in a facility. The approach describes an automated data collection method that does not require an agent to train an RTLS ML model.

One aspect is a real-time location system comprising sensor pairs of multiple sensors and an upstream device communicating with the sensors. The sensor pairs include a transmitting sensor and a receiving sensor for each sensor pair. Each sensor is assigned as the transmitting sensor in turn, while all other sensors are designated as receiving sensors and signal strength data is collected at each receiving sensor. By the end of this process, the system has signal strength data for each sensor pair in the sensor network. The upstream device determines a labelled dataset based on the signal strength data for the sensor pairs and zone labels associated with the signal strength data. The upstream device augments the signal strength data of the sensor pairs to simulate tags sending data to sensors at various locations within the zone to generate a labelled dataset. The RTLS ML model is trained based on the labelled dataset.

Another aspect is a method for real-time location system. Signal strength data for sensor pairs of multiple sensors are collected. Each sensor pair includes a transmitting sensor and a receiving sensor. Each sensor is assigned as the transmitting sensor in turn, all other sensors are designated as receiving sensors and collect signal strength data for beacons transmitted by each transmitting sensor. A labelled dataset is determined based on the signal strength data for the sensor pairs and zone labels associated with the signal strength data. The RTLS ML model is trained based on the labelled dataset.

The above-described features and advantages and others will become more readily apparent to those of ordinary skill in the art by reference to the following detailed description and accompanying drawings. While it would be desirable to provide one or more of these or other advantageous features, the teachings disclosed herein extend to those embodiments that fall within the scope of the appended claims, regardless of whether they accomplish one or more of the advantages as mentioned above.

BRIEF DESCRIPTION OF THE DRAWINGS

For a more complete understanding of the present disclosure and the advantages thereof, reference is now made to the following descriptions taken in conjunction with the accompanying drawings, wherein like numbers designate like objects.

DETAILED DESCRIPTION

Figure 1:
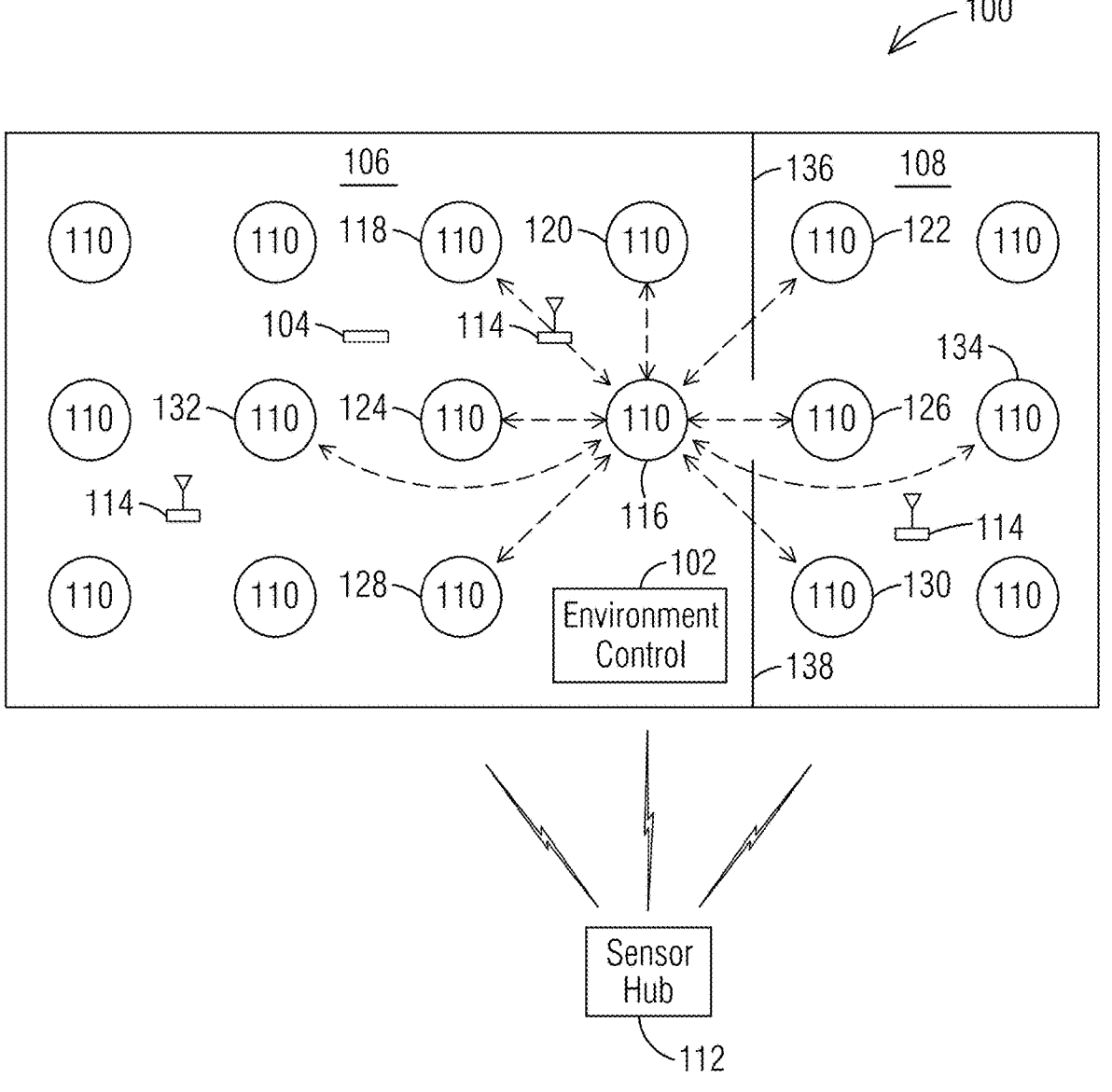
FIG. 1 is an overhead planar view of an RTLS in an example implementation that is operable to employ techniques described herein.

Various technologies that pertain to systems and methods that facilitate training and operation of a machine learning model for a real-time location system (RTLS) will now be described with reference to the drawings, where like reference numerals represent like elements throughout the disclosure. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is understood that functionality described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

In accordance with at least one embodiment of the disclosure, a Real-time Location System (RTLS) approach for asset tracking is provided. The RTLS utilizes machine learning techniques to locate asset tags in a facility. Conventional system for RTLS require an agent to move around each zone using wireless tags while recording the data received by the sensors, which requires valuable time and resources. In some cases, these conventional systems may be difficult to organize logistically due to the collection of data during customer site operating hours and/or customer escort due to security concerns. The data collection approach described herein utilizes sensor-to-sensor communications, instead of mobile tag-to-sensor communications, to generate training data for the RTLS ML model. The RSSI-to-distance relation is used to augment the signal strength of beacons sent by a transmitting sensor at a fixed position to a receiving sensor. This augmentation is used to simulate the beacon being sent by a tag at various positions within a particular zone.

The sensor activation is measured using received signal strength of communications between sensors, such as RSSI values. A label identifies a zone associated with a tag location. Labelled data, which includes the signal strength data and the zone labels, are used to train an ML model.

Referring to FIG. 1, there is shown a real-time location system (RTLS) 100 for identifying the location of one or more objects in a facility. For some embodiments, the RTLS 100 may include a sensor management system that provides information to a building management system or other management services, such as an environmental control system 102 of a facility, to enhance services provided to building owners, managers, technicians, and occupants. The RTLS 100 may assist the building management system to manage the environmental conditions based at least in part on the locations of beacon tags 104, such as those conditions experienced by an occupant or other asset associated with the beacon tag. The RTLS 100 includes infrastructure 110, 112, 114 to establish locations of one or more beacon tags 104 within a structure, such as an indoor or defined space of a facility. The structure may include various partitioned or designated areas 106, 108 of the structure, such as floors, rooms, hallways, or defined open spaces associated with the structure. Each area 106, 108 of the structure may include devices of the infrastructure such as multiple sensors 110.

For some embodiments, a sensor hub 112 may be co-located with some or all sensors within an area 106, 108 of the facility. For other embodiments, the sensor hub may be remote from the sensors and/or the facility. For example, the sensor hub 112 may locate in the Cloud and communicate directly or indirectly with the sensors 110, at least in part, via the Internet or other communication network. The sensor hub 112 communicates directly or indirectly with the sensors 110, and the interconnection between the sensor hub 112 and the sensors may include wired, wireless, or both connections. Some embodiments of the RTLS 100 may include wired or wireless gateways 114 positioned among the sensors 110 at the facility. The gateways may serve as a communication transponder between the sensor hub 112 and the sensors. Similar to sensors 110 and the sensor hub 112, the gateways 114 may also process data to employ techniques described herein.

The sensors 110 of the infrastructure may be positioned at fixed locations throughout the area 106, 108. The sensors 110 may be evenly distributed throughout each area 106, 108, or selectively distributed in a non-even manner, as may be preferred for beacon tag detection. The sensors 110 are configured to detect beacons broadcast by one or more sources associated with assets' positions. For example, occupants may carry the beacon tags 104 for detection by the sensors 110, among other purposes, to facilitate tracking of the devices. Each of the beacon tags 104 may be any type of transportable device capable of wireless communication with sensors 110 of the facility. Examples of beacon tags 104 include, but are not limited to, tags, wearables, wireless communication devices, tablets, portable computing devices, and any other type of transportable device that includes circuitry for transmitting a beacon.

As illustrated by FIG. 1, the RTLS 100 includes multiple sensors 110 capable of communicating with each other via wireless communications, such as radio frequency (RF) signals. Examples of wireless communications include, but are not limited to, Bluetooth (including BLE), the ultrawideband (UWB). Wi-Fi (including Wi-Fi Direct), cellular, satellite, mesh networks, PAN, WPAN, WAN, Zigbee, near-field communications, and other types of radio communications and their variants. For any given sensor 110 of the RTLS 100, a transmitting sensor 116 may be positioned at a transmitting sensor location within the structure, and one or more proximal receiving sensors 118, 120, 122, 124, 126, 128, 130 may be positioned at receiving sensor locations within the structure proximally adjacent to the transmitting sensor. For some embodiments, one or more distal receiving sensors 132, 134 may be positioned at receiving sensor locations within the structure proximally further from the transmitting sensor 116, in which one or more proximal receiving sensors 118, 120, 122, 124, 126, 128, 130 are, at least in part, between the transmitting and distal receiving sensors or otherwise closer to the transmitting sensor relative to the distal receiving sensor(s). Each sensor, and its location, is positioned within the reception range of wireless signals transmitted by one or more of the other sensors. It is to be understood that, although a specific sensor is described as a transmitting or first sensor and specific sensors are described as receiving or second sensors, all sensors of the RTLS 100 may be transmitting and/or receiving sensors.

For the RTLS 100, the transmitting sensor 116 may transmit one or a burst of wireless signals that may be detected or received by one or more sensors 110, such as the proximal receiving sensors 118-130, the distal receiving sensors 132-134, or both. The receiving sensors, such as the proximal or distal receiving sensors 118-134, may determine a measured wireless signal ("wireless signal") and its corresponding value based on the received wireless signals. For example, the measured wireless signal may be a received signal strength indicator (RSSI) or equivalent value if one signal is transmitted, or statistical features based on multiple received signals from the transmitting sensor. Also, an expected wireless signal or expected statistical features based on the location of the transmitting sensor 116 (i.e., transmitting sensor location) and the location of the proximal and/or distal receiving sensors 118-134 (i.e., receiving sensor location) may be determined or otherwise known to the receiving sensors 118-134, a device upstream from the receiving sensor (i.e., upstream device), or both. For example, a distance between the transmitting and receiving sensors 116-134 may be determined from these sensors' location. The distance may be correlated with the expected wireless signal (RSSI, etc.) or the expected statistical features. The locations of a given pair of sensors correspond to an expected wireless signal of those sensors. Examples of the upstream device include, but are not limited to, the sensor hub 112 or the gateway 114.

The statistical features based on signals detected or received by the receiving sensor 118-134 or otherwise measured by the RTLS 100 are considered to be detected statistical features, and the statistical features determined by the RTLS 100 are considered to be expected statistical features. The detected and expected statistical features differ in that the expected statistical features are determined independently from the detected wireless signals detected or received at the second sensor 118-134 from the first sensor 116. The methods of determining each expected statistical may be based on, but are not limited to, a known distance between the first and second locations, a floor plan associated with the first and second sensors, or from a predetermined lookup table associated with the first and second sensors.

Statistical features attempt to characterize the distribution of received wireless signals. Received statistical features and expected statistical features include primary statistical features and derived statistical features. Primary statistical features include, but are not limited to, a number of received wireless signals, a sum of received wireless signals, a squared sum of received wireless signals, and a combination of received signals from the wireless signals. Derived statistical features includes, but are not limited to, mean, standard deviation, mode, median, minimum, and maximum values of the received wireless signal. The derived statistical features may be derived or calculated from the primary statistical features. For some embodiments, the division of primary and derived statistical features may be considered to be somewhat artificial for the main purpose of reducing bandwidth. For example, primary statistical features may be computed at one or more sensors and transmitted to an upstream device, and derived statistical features may be calculated based on the primary statistical features to describe the statistical distribution of the wireless signals. Where concerns about bandwidth are minimal, received wireless signals may be transmitted from multiple sensors to the upstream device(s) such that all, or a significant portion, of the statistical analysis may be performed upstream.

Statistical features may be determined at a receiving sensor and/or an upstream device. In particular, received or other statistical features may be determined at a receiving or second sensor 118-134, a gateway 114, the sensor hub 112, in the Cloud, or a combination of these entities. In addition, the received wireless signals or a signal based on the received wireless signals may be provided to the upstream device (such as the sensor hub 112 and/or gateway 114) to determine the primary and/or derived statistical feature or features. For example, primary statistical features may be determined at a receiving sensor, and derived statistical features may be determined at the upstream device. Division and coordination of statistical feature operations may be utilized to minimize network traffic and reduce chances of transmitting errors.

The upstream device 112, 114 may be configured to determine that a difference between the measured wireless signal ("wireless signal") and the expected wireless signal, and/or their corresponding values, exceeds predetermined thresholds and take specific actions. The actions include, but are not limited to, providing a notification to a remote device, communicating signals between sensors, or performing follow-up actions to determine the differential between the signal values. For one embodiment, the upstream device 112, 114 may notify a mobile device associated with a technician or a control center of a building management system to investigate the sensors associated with the abnormal signal value differential. For another embodiment, the upstream device 112, 114 may instigate further communications between the sensors 116-134, beyond the previously communicated wireless signals from the transmitting sensor to the receiving sensor. For example, the transmitting sensor 116 may transmit wireless signals to other sensors (whether a proximal or distal receiving sensor 118-134) associated with the signal value differential, or vice versa. In doing so, the system may determine whether either sensor locates at an expected location relative to the other sensor, corresponds to a location indicated by a floor or ceiling plan, or otherwise operates as expected. A non-RF signal, such as a light or audio-based signal, may be used for further communication to compensate for any RF signal's inadequacies previously communicated between the sensors. For yet another embodiment, the upstream device 112, 114 may identify an obstruction between the sensors 116-134, such as a structural object, a movable object, or a live object. Examples of a structure object include a wall, partition, or overhang; examples of a movable object include furniture, equipment, or personal items; and examples of live objects include humans, bugs, and other animals. For yet another embodiment, the upstream devices 112, 114, may identify one or more sensors in the environment 106, 108 that have malfunctioned, are out of calibration, or otherwise transmitting or receiving signals abnormally. These sensors need to be reset, recalibrated, serviced or replaced to maintain the system's integrity.

The RTLS 100 may identify obstructions within the structure, such as the structural objects, movable objects, and live objects described above. By determining that a difference between the measured wireless signal and the expected wireless signal, and/or their corresponding values, exceeds a predetermined threshold, the upstream device 112, 114 may determine that an obstruction exists between the transmitting sensor 116 and the receiving sensor (such as the proximal receiving sensor 118-130 or the distal receiving sensor 132-134). For example, as illustrated in FIG. 1, a first obstruction 136 may exist between the transmitting sensor 116 and the receiving sensor 122. A second obstruction 138 may exist between the transmitting sensor 116 and the receiving sensor 130. The signal value differential may indicate the obstruction(s) 136, 138, and the upstream device 112, 114 may take the appropriate response.

The RTLS 100 may expect one or more obstructions within the structure, particularly if indicated by a floor or ceiling plan. By determining that a difference between the measured wireless signal and the expected wireless signal exceeds a predetermined threshold, the upstream device 112, 114 may determine that it is contradictory that the obstruction does exist between the transmitting sensor 116 and the receiving sensor (such as the proximal receiving sensor 118-130 or the distal receiving sensor 132-134) in a situation where the obstruction should exist. For example, as illustrated in FIG. 1, a first obstruction 136 may exist between the transmitting sensor 116 and the receiving sensor 122. A second obstruction 138 may exist between the transmitting sensor 116 and the receiving sensor 130, or both. The signal value differential may indicate a lack of the obstruction(s)

136, 138 (i.e., fail to indicate the existence of the obstruction), which may be caused, for example, by misplacement of sensors or incorrectly mapping of a sensor on a floor or ceiling plan. In response, the upstream devices 112, 114 may take appropriate actions.

A sensor might demonstrate signal differentials between measured wireless signal and expected wireless signal, explained above, that exceed the thresholds, or otherwise determined as abnormal, consistently when multiple sensors are transmitting while the sensor is receiving. That might indicate the sensor's receiving capability is abnormally comparing to the specification. When a sensor is transmitting, other sensors might demonstrate signal differentials that exceed the thresholds or otherwise be determined as abnormal. That behavior might indicate the transmitting capability is abnormal. In these cases, the upstream devices 112, 114 might also take appropriate actions.

Figure 2:
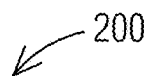
FIG. 2 is a block diagram of example components of a sensor of FIG. 1.

FIG. 2 represents example device components 200 of a sensor, such as a sensor 110 of the RTLS 100, for asset tracking of beacon tags. The device components 200 of the sensor comprise a communication bus 202 for interconnecting other device components directly or indirectly. The other device components include one or more communication components 204 communicating with other entities via a wired or wireless network, one or more processors 206, and one or more memory components 208.

The communication component 204 of the sensor is configured to communicate with another sensor's communication component and receive a beacon broadcast from a beacon tag or another sensor. The communication component 204 may utilize wireless technology for communication, such as radio frequency (RF), infrared, microwave, light wave, and acoustic communications. RF communications include, but are not limited to, Bluetooth (including BLE), ultra-wideband (UWB), Wi-Fi (including Wi-Fi Direct), Zigbee, cellular, satellite, mesh networks, PAN, WPAN, WAN, near-field communications, and other types of radio communications and their variants. For some embodiments, the communication component 204 of the device components 200 may also utilize wired technology for communication, such as the transmission of data over a physical conduit, e.g., an electrical or optical fiber medium. Each sensor may include more than one communication component 204. For example, a sensor may include a communication component for receiving the beacon from a beacon tag, a communication component for RF communication with another sensor, and a communication component for non-RF communication with the other sensor.

The processor 206 may execute code and process data detected or received from other components of the device components 200, such as information received at the communication component 204 or stored at the memory component 208. The code associated with the RTLS 100 and stored by the memory component 208 may include but is not limited to operating systems, applications, modules, drivers, and the like. An operating system includes executable code that controls basic functions of the sensor, such as interactions among the various components of the device components 200, communication with external devices via the communication component 204, and storage and retrieval of code and data to and from the memory component 208.

Each application includes executable code to provide specific functionality for the processor 206 and/or remaining components of the sensor. Examples of applications executable by the processor 206 include, but are not limited to, a communications module 210 to perform communication operations with other sensors, receiving the transmission from proximal beacon tags, and transmitting collected and/or calculated data to one or more upstream devices, and an operation module 212 to perform general and specific operations at the sensor. For some embodiments, the operation module 212 may determine a difference between the measured wireless signal and the expected wireless signal (or their corresponding statistical features and expected statistical feature values). The operation module 212 of each receiving sensor may also determine a signal strength value, a signal strength sum value, and a signal strength squared value of a received beacon.

Data stored at the memory component 208 is information that may be referenced or manipulated by an operating system or application for performing functions of the sensor. Examples of data associated with the RTLS 100 and stored by the memory component 208 may include, but are not limited to, data values 214 such as expected wireless signals and measured wireless signals and data thresholds 216 such as the predetermined threshold to be compared with the difference between the measured and expected wireless signals. The statistical data values 218 might include, but not limited to, the number of received RF signals, the sum of the received RF signals, the sum of squared RF received signals, and possibly the individual received signal.

The device components 200 of each sensor 110 may include one or more input components 220 and one or more output components 222. The input components 220 and output components 222 of the device components 200 may, include one or more visual, audio, mechanical, or other components. For some embodiments, the input and output components 220, 222 of each sensor 110 may include a user interface 224 for interaction with a device user. The user interface 224 may include hardware and software to provide a user with the desired user experience. Examples of input components 220 include, but are not limited to, a light sensor 226 (such as a passive infrared sensor), audio sensor 228 (such as a microphone), motion sensor 230, atmospheric sensor 232 (such as temperature, humidity, pressure, etc.), and a combination of sensing technologies. Examples of output components 220 include, but are not limited to, displays 234, visual indicators 236, audio speakers 238, mechanical actuators 240, and a combination of output technologies.

It is to be understood that FIG. 2 is provided for illustrative purposes to represent examples of the device components 200 of a sensor 110. It is not intended to be a complete diagram of the various components utilized by the device. Therefore, sensor 110 may include various other components not shown in FIG. 2, may include a combination of two or more components, or a division of a particular component into two or more separate components, and still be within the scope of the present invention.

Figure 3:
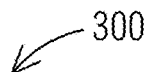
FIG. 3 is a block diagram of example components of an upstream device of FIG. 1.
Figure 3:
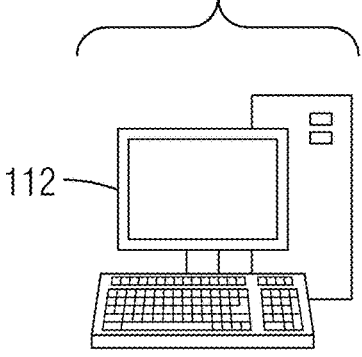

FIG. 3 represents example device components 300 of an upstream device, such as the sensor hub 112 or the gateway 114, for supporting the RTLS. The device components 300 of the upstream device 112, 114 comprise a communication bus 302 for interconnecting other device components directly or indirectly. The other device components include one or more communication components 304, communicating with other entities via a wired or wireless network, one or more processors 306, and one or more memory components 308. The communication component 304 is configured to communicate with multiple sensors 110, either directly or via one or more other upstream devices. The communication component 304 may utilize wireless technology, wired technology, or a combination of these technologies for communication with other devices, similar to the sensors described above in reference to FIG. 2.

The processor 306 may execute code and process data detected or received from other components of the device components 300, such as information received at the communication component 304 or stored at the memory component 308. The code associated with the RTLS 100 and stored by the memory component 308 may include, but is not limited to, operating systems, applications, modules, drivers, and the like. An operating system includes executable code that controls basic functions of the upstream device 112, 114, such as interactions among the various components of the device components 300, communication with external devices via the communication component 304, and storage and retrieval of code and data to and from the memory component 308.

Each application includes executable code to provide specific functionality for the processor 306 or remaining components of the upstream device 112, 114, or both. Examples of applications executable by the processor 306 include, but are not limited a data augmentation module 310 and a training/inference module 312. The data augmentation 310 augments the sensor-to-sensor dataset to generate the labelled dataset. The training/inference module 312 trains an RTLS model and/or the location of a beacon tag by the trained RTLS model. The ML model 314 results from the training operation and generates RTLS outputs based on the labelled dataset.

Data stored at the memory component 308 is information that may be referenced and manipulated by an operating system or application for performing functions of the upstream device 112, 114. Examples of data associated with the RTLS 100 and stored by the memory component 308 may include, but are not limited to training/inference data 316. The training/inference data 316 includes one or more labelled datasets and/or one or more locations of beacon tags as determined by the training/inference module 312. The memory component also includes the ML model 314 which is the result of the executing the training operation 312 on the labelled dataset 316.

The device components 300 of each upstream device 112, 114 may include one or more input and output components, i.e., I/O interfaces 318. The I/O interfaces 318 of the device components 300 may include one or more visual, audio, mechanical, or other components. For some embodiments, the I/O interfaces 318 of each upstream device 112, 114 may include a user interface 320 for interaction with a device user. The user interface 320 may include a combination of hardware and software to provide a user with the desired user experience. For example, the user interface 320 may include one or more input components to allow the user to enter information, such as mechanical buttons or audio input, and one or more output components to provide information to the user, such as a visual or audio indicator to show an operational status of the upstream device 112, 114.

It is to be understood that FIG. 3 is provided for illustrative purposes only to represent examples of the device components 300 of an upstream device 112, 114 and is not intended to be a complete diagram of the various components that the device may utilize. Therefore, upstream devices 112, 114 may include various other components not shown in FIG. 3, may include a combination of two or more components, or a division of a particular component into two or more separate components, and still be within the scope of the present invention.

Figure 4:
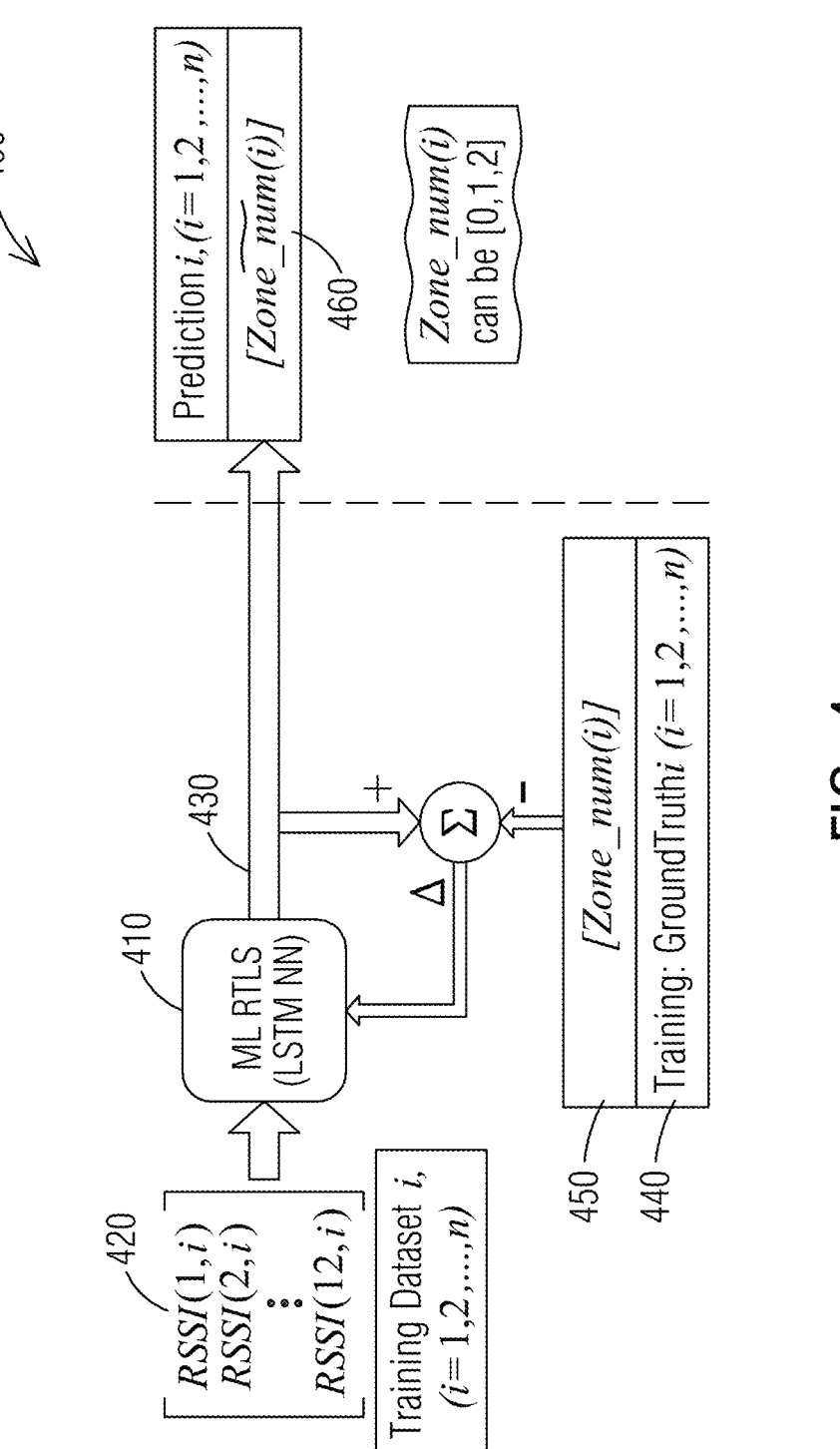
FIG. 4 is a flow diagram of training and production inference pipeline of the RTLS that is operable to employ the techniques of FIG. 1.

Referring to FIG. 4, there is shown a flow diagram of training and production inference pipeline 400 of the RTLS 100. The RTLS 100 includes a machine learning (ML) component, such as an analysis processor 410, that is trained by incoming data 420, namely a training dataset, and operates after training by the incoming data 420, namely an operation dataset. As represented by the inference pipeline 400, the system includes the analysis processor 410 that determines a labelled dataset 430.

When the incoming data 420 is the training dataset, the labelled dataset 430 is compared with ground truth data 440 and used to train the analysis processor 410 during training. For example, the training dataset of the incoming data 420 is fed to the analysis processer 410 to assist the processor with learning how to identify a particular zone 450 corresponding to the incoming data. For some embodiments, the analysis processor 410 is a machine learning model for real-time location services. For example, the analysis processor 410 may be a Long Short-Term Memory Neural Network ("LSTM NN") used in the fields of artificial intelligence and machine learning. Supervised learning is utilized for the analysis processor 410 since ground truth 440 is provided to the analysis processor 410. The ground truth is associated with label to be generated by the machine learning model.

When the incoming data 420 is the operation dataset, the labelled dataset 430 identifies the locations of beacon tags during operation. For example, the analysis processor 410 identifies a particular zone 460 based on operation dataset of the incoming data 420. For the production portion of the inference pipeline 400, the analysis processor 410 has been trained and is ready to determine the zone 460 of a beacon tag based on sensor RSSI values. The trained model of the analysis processor 410 is used to make inference on live data, thus determining the tag's location. The model learns from its mistakes and, eventually, becomes proficient at predicting the label, i.e., the zone 460.

For some embodiments, the analysis processor 410 and its components may reside in the Cloud. Sensors may send data as a dataset to the Cloud via a gateway that sends the data to the Cloud. The dataset is used to train the machine learning model of the analysis processor 410 in the Cloud. The trained model may be deployed to the Cloud, and the model may listen to sensor data and respond with a zone based on the received sensor data.

Figure 5:
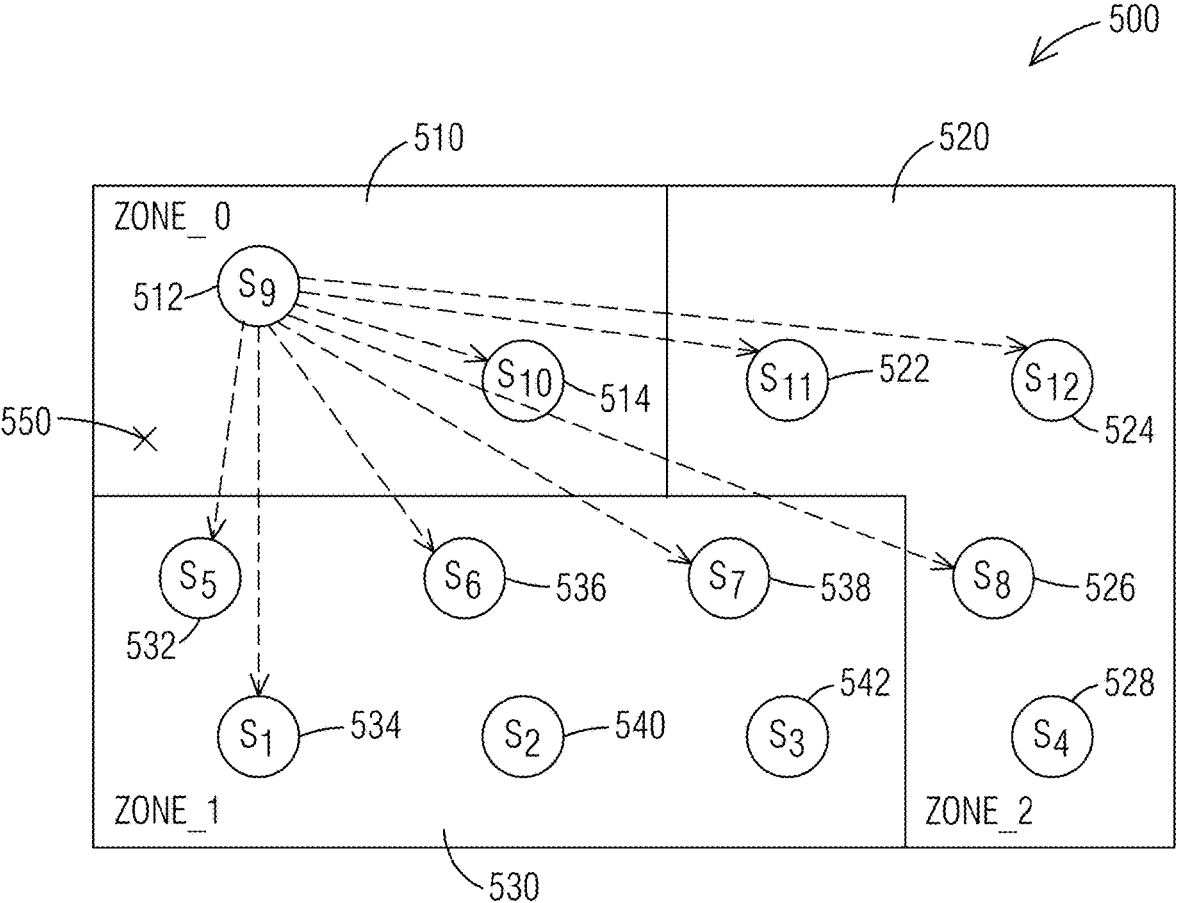
FIG. 5 is an illustration of a floor plans representing an example data collection operation of the training inference pipeline of FIG. 4.

Referring to FIG. 5, there is shown a floor plan 500 representing an example data collection operation of the training inference pipeline. The floor plan 500 is established, and multiple zones 510, 520, 530 are identified in the floor plan. Sensors 512-514, 522-528, 532-542 are then installed and commissioned in the zones 510, 520, 530 based on requirements on how many sensors are needed or desired per zone. Thereafter, a labelled dataset is generated to train the machine learning component of the analysis processor 410. Specifically, signal strength data for sensor pairs of multiple sensors 512-514, 522-528, 532-542 are collected, in which each sensor pair includes a transmitting sensor and a receiving sensor. Each sensor of the multiple sensors 512-514, 522-528, 532-542 is assigned as the transmitting sensor in turn, and the signal strength data for each sensor pair corresponds to beacons transmitted by each transmitting sensor and received each receiving sensor.

The collection of signal strength data may be represented by the following example in which a transmitting sensor 512 sends a beacon to reachable sensors 514, 522, 524, 526, 532, 534, 536, 538. As noted above, each sensor may take a turn in being the transmitting sensor. Each sensor that receives the transmitted beacon may measure a signal strength value and generate RSSI statistics (mean, sigma, reception rate) based on the signal strength value as previously described. The signal strength values and/or the RSSI statistics are provided to one or more upstream devices. The statistics may be used to check the health of the sensor network prior to using the data to train the ML model.

The upstream device generates an augmented labelled dataset to train the ML-RTLS model. Sensors are used to beacon other sensors in contrast to conventional system, which train machine learning models using a tag to beacon the sensors. In order to use data from a sensor to accurately represent data coming from a tag. The upstream device uses an RSSI-to-distance relation to augment the sensor-to-sensor beacon RSSI. As a result, the augmented signal strength values simulate data from a tag in different positions within the zone. For example, signal strength values may be augmented to simulate various tag positions in a first zone 510 (Zone_0), such as example position 550. An RSSI-to-Distance model is used to generate RSSI at simulated tag positions. For some embodiments, the RSSI-to distance relation may be represented by:

$$\text{Distance} = 10 \wedge ((\text{Measured Power} - RSSI)/(10 * N)) \quad (1)$$

Since the first sensor 512 may not sense its own beacon, the first RSSI value at the first sensor may be simulated using a second RSSI value of a sensor 514 within same zone closest to the first sensor 512.

The RTLS 100 determines a labelled dataset to train the RTLS model of the RTLS. In particular, the analysis processor adds a zone label to generate the labelled data set.

Figure 6:
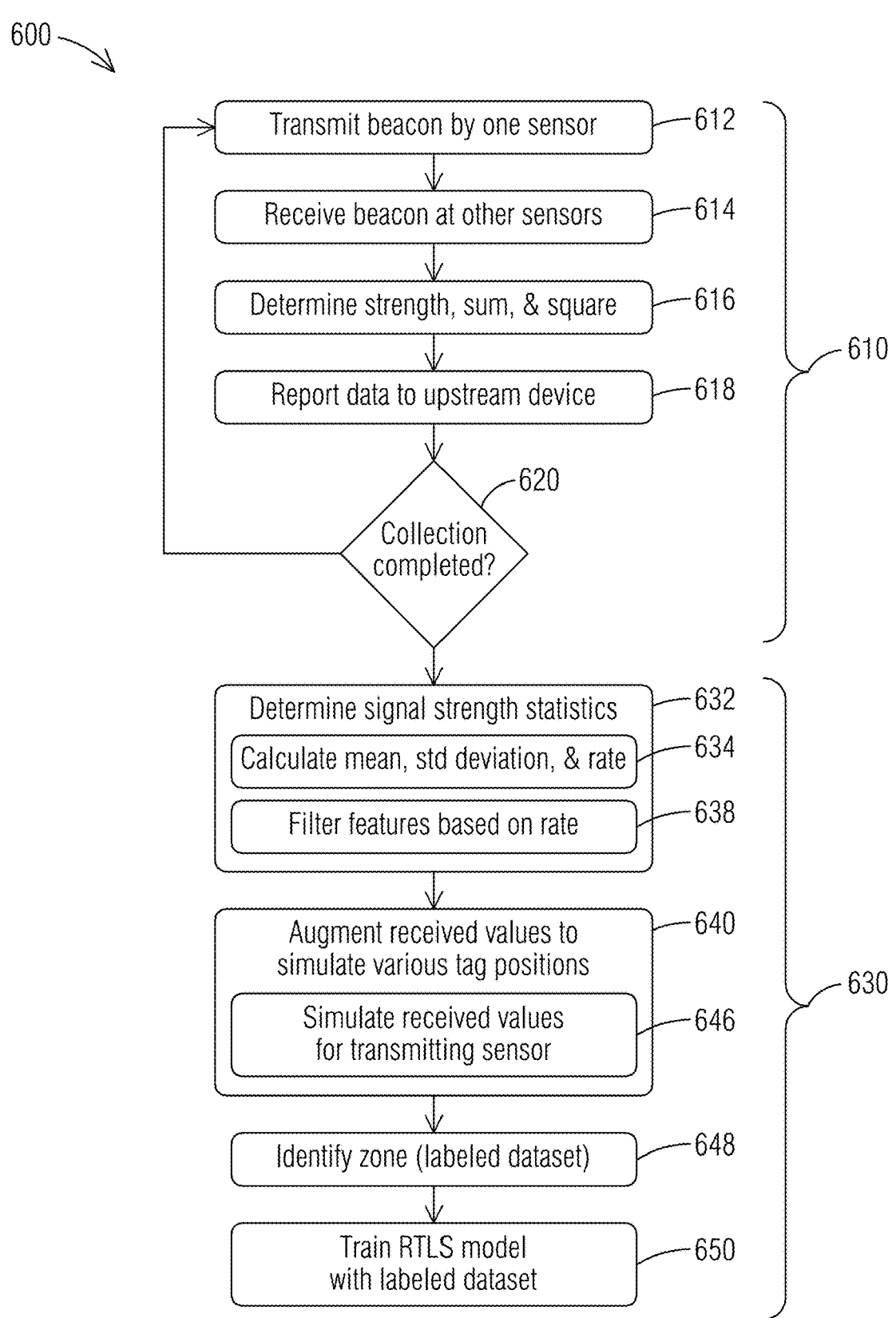
FIG. 6 is a flow diagram representing a data collection operation of the training inference pipeline of FIG. 4 in an example implementation that is operable to employ techniques described herein.

Referring to FIG. 6, a flow diagram represents an example process or system operation 600 of the RTLS 100. An ML model of an RTLS 100 may be trained with signal strength values based on signals sent between sensors, as opposed to between a tag and a sensor. The ML model may learn a latent zone fingerprint from the association of signal strength data to zone labels. The ML model encodes or learns a fingerprint for each zone. To accurately represent data from a tag, the signal strength-to-distance relation is used to augment the sensor-to-sensor signal to appear to come from a tag at different positions within the zone.

The operation 600 of an RTLS includes a collection subprocess 610 and an analysis subprocess 630 to generate training data for the training inference pipeline. In particular, the analysis subprocess 630 determines a labelled dataset based on the signal strength data for the sensor pairs and zone labels associated with the signal strength data. For the collection subprocess 610, signal strength data for sensor pairs of multiple sensors is collected (612, 614). Each sensor pair including a transmitting sensor and a receiving sensor, and each sensor is assigned as a transmitting sensor in turn. Each sensor serves as the transmitting sensor sequentially and transmits (612) a beacon. Thus, each sensor gets a turn as the transmitting sensor. The other non-transmitting sensors receive (614) from the transmitting sensor in response to the beacon transmission (612). The signal strength data for each sensor pair corresponds to the beacons transmitted by each transmitting sensor and received by each receiving sensor. For some embodiments, each receiving sensor may determine (616) the signal strength value, a signal strength sum value, and a signal strength squared value of the received beacon. In any case, the receiving sensors report (618) data to the upstream device, whether the measured data received or the calculated data determined from the measured data. The collection subprocess continues until each sensor has an opportunity to transmit one or more beacons and the other sensors have an opportunity to receive the beacon (620).

For example, for the collection subprocess 610, one sensor on the network transmits a number of RF beacons at a predetermined power level. All other sensors on the network listen and record the number, the sum, and the squared sum of the received RF beacon. The subprocess 610 repeats with the next sensor in the network until all sensors in the RTLS have chance to transmit, receive, and report. The collection subprocess 610 may be repeated multiple times to increase the robustness of its results.

For each sensor pair, a data set captures signal strength values and, for some embodiments, may calculate an RSSI sum value, an RSSI squared sum value, and an RSSI count value based on the signal strength values. The RSSI sum value is the sum of all RSSI values received. The RSSI squared sum value is the sum of the squares of all received RSSI signals. The RSSI count value is the number of RSSI signals received.

For the analysis subprocess 630 of the operation 600, the subprocess generates statistics and labels. The analysis subprocess 630 generates (632) the signal strength statistics by sensor pairs, i.e., one sensor communicating with another sensor. The statistics may be used for various purposes, such as checking the health of the sensor network prior to using the data to train the ML model. For some embodiments, the signal strength statistics are generated by calculating (634) a mean feature, a standard deviation feature, and a reception rate feature for each pair of transmitting and receiving sensors based on the signal strength values of the wireless communication data. The mean feature, the standard deviation feature, and the reception rate feature for each sensor pair may be determined based on the RSSI sum value, the RSSI squared sum value, and the RSSI count value. The reception rate is calculated based on a number of beacons communicated between the corresponding pair of transmitting and receiving sensors. The reception rate may be calculated by dividing the RSSI count value by a MAX_NUM_TX, which is the constant number of beacons each beaconing sensor sends out.

For some embodiments, determining (632) the signal strength statistics includes filtering (638) the mean feature and the standard deviation feature based on the reception rate feature. For example, the mean feature and the standard deviation feature may be filtered by assigning a null value to a particular mean feature or standard deviation feature based on the corresponding reception rate feature being below a threshold rate. The receiving rate data feature may be used to perform filtering (638) on the mean and standard deviation features. When the receiving rate for an entry is below a particular threshold, the data may be considered statistically insignificant and assigned the null value.

For some embodiments, the analysis subprocess 630 of the operation 600 determines an operation of the upstream device to modify (640) the signal strength data to simulate a beacon tag position. The beacon tag position may be simulated based on a signal strength statistic, a signal strength-to-distance model or both. For some embodiments, the upstream device may simulate (646) a signal strength value at a particular sensor based on a signal strength value of a closest sensor nearest the particular sensor.

The analysis subprocess 630 of the operation 600 determines (648) one or more labelled datasets, which may include signal strength data of sensor-to-sensor communication and zone labels. The ML model of the RTLS 100 may be trained (650) using the labelled dataset for real time location service. For some embodiments, the upstream device may determine a location of a beacon tag by the trained RTLS model of the real-time location system based on received signal strength data collected from a beacon tag at one or more sensors to determine a location of the beacon tag.

Figure 7:
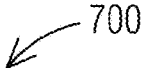
FIG. 7 is a representation of a labelled dataset determined for the training process of the RTLS ML.

Referring to FIG. 7, there is shown a labelled dataset 700 for the training process of the RTLS ML model. The labelled dataset 700 includes signal strength data 710, raw or processed, collected by the receiving sensors. Zone labels 720 are added and associated with each beacon signal received by the receiving sensors. The labelled dataset is used to train the machine learning component of the RTLS. Supervised learning is used to train the machine learning process of the analysis processor 510 to distinguish between zones based on the RSSI fingerprint. For the embodiment shown in FIG. 7, the labelled data is shown with the zone identified for every data point.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms. The present disclosure applies equally regardless of the particular type of instruction or signal-bearing medium, or storage medium utilized to carry out the execution. Examples of machine-usable/readable or computer-usable/readable mediums include non-volatile, hard-coded type mediums such as read-only memories (ROMs) or erasable, electrically programmable read-only memories (EEPROMs), and user-recordable type mediums such as floppy disks, hard disk drives, and compact disk read-only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A real-time location system using sensor-to-sensor data collection comprising:

sensor pairs for a plurality of sensors including a transmitting sensor and a receiving sensor for each sensor pair, each sensor of the plurality of sensors being assigned as the transmitting sensor in turn, all other sensors of the plurality of sensors being designated as the receiving sensors and collecting signal strength data for beacons transmitted by each transmitting sensor;

an upstream device communicating with the plurality of sensors, the upstream device determining a labelled dataset based on the signal strength data for the sensor pairs of the plurality of sensors and zone labels associated with the signal strength data; and an RTLS ML model trained based on a labelled dataset.

2. The real-time location system as described in claim 1, wherein the labelled dataset includes particular signal strength data for each sensor pair and a zone label corresponding the particular signal strength data for each sensor pair.

3. The real-time location system as described in claim 1, wherein each receiving sensor of the plurality of receiving sensors determines the signal strength value, a signal strength sum value, and a signal strength squared value of the received beacon.

4. The real-time location system as described in claim 1, wherein the upstream device modifies the signal strength data to simulate a beacon tag position based on at least one of a signal strength statistic or a signal strength-to-distance model.

5. The real-time location system as described in claim 1, wherein upstream device simulates a signal strength value at a particular sensor of the plurality of sensors based on a signal strength value of a closest sensor nearest the particular sensor.

6. The real-time location system as described in claim 1, wherein the RTLS model is a machine learning neural network to identify a zone associated with the signal strength data.

7. The real-time location system as described in claim 1, wherein the upstream device determines a location of a beacon tag by the trained RTLS model based on signal strength data collected from a beacon tag and at least one sensor of the plurality of sensors to determine a location of the beacon tag.

8. The real-time location system as described in claim 1, wherein the RTLS ML model is trained to learn a latent zone fingerprint for each zone based on the labelled dataset.

9. A method for real-time location system using sensor-to-sensor data collection comprising:

collecting signal strength data for sensor pairs of a plurality of sensors, each sensor pair including a transmitting sensor and a receiving sensor, each sensor of the plurality of sensors being assigned as the transmitting sensor in turn, all other sensors of the plurality of sensors being designated as the receiving sensors and collecting signal strength data for beacons transmitted by each transmitting sensor;

determining a labelled dataset based on the signal strength data for the sensor pairs of the plurality of sensors, the labelled dataset including zone labels associated with the signal strength data; and training an RTLS ML model based on the labelled dataset.

10. The method as described in claim 9, wherein the labelled dataset includes particular signal strength data for each sensor pair and a zone label corresponding the particular signal strength data for each sensor pair.

11. The method as described in claim 9, further comprising determining the signal strength value, a signal strength sum value, and a signal strength squared value of the received beacon.

12. The method as described in claim 9, wherein further comprising modifying the signal strength data to simulate a beacon tag position based on at least one of a signal strength statistic or a signal strength-to-distance model.

13. The method as described in claim 9, wherein further comprising simulating a signal strength value at a particular sensor of the plurality of sensors based on a signal strength value of a closest sensor nearest the particular sensor.

14. The method as described in claim 9, wherein the RTLS model is a machine learning neural network to identify a zone associated with the signal strength data.

15. The method as described in claim 9, further comprising determining a location of a beacon tag by the trained RTLS model based on signal strength data collected from a beacon tag and at least one sensor of the plurality of sensors to determine a location of the beacon tag.

16. The method as described in claim 9, wherein training the RTLS model includes training the RTLS ML model to learn a latent zone fingerprint for each zone based on the labelled dataset.

* * * * *